United States Patent [19]
Wolf et al.

[11] Patent Number: 5,332,965
[45] Date of Patent: Jul. 26, 1994

[54] CONTACTLESS LINEAR ANGULAR POSITION SENSOR HAVING AN ADJUSTABLE FLUX CONCENTRATOR FOR SENSITIVITY ADJUSTMENT AND TEMPERATURE COMPENSATION

[75] Inventors: Ronald J. Wolf, Goshen; Larry Hedeen, Howe, both of Ind.

[73] Assignee: Durakool Incorporated, Elkhart, Ind.

[21] Appl. No.: 902,075

[22] Filed: Jun. 22, 1992

[51] Int. Cl.$^5$ .................. G01B 7/14; G01R 35/00
[52] U.S. Cl. ..................... 324/207.12; 324/207.2; 324/207.25; 324/202; 324/225
[58] Field of Search ............... 324/202, 207.12, 207.2, 324/207.21, 207.22, 207.25, 225, 173, 174, 235

[56] References Cited

U.S. PATENT DOCUMENTS

| | | |
|---|---|---|
| 2,942,177 | 6/1960 | Neumann et al. |
| 2,992,369 | 7/1961 | LaRocca |
| 3,060,370 | 10/1962 | Varterasian |
| 3,112,464 | 11/1963 | Ratajski et al. |
| 3,118,108 | 1/1964 | Zoss et al. |
| 3,185,920 | 5/1965 | Brunner |
| 3,473,109 | 10/1969 | Maaz et al. |
| 3,482,163 | 12/1969 | Peek et al. |
| 3,818,292 | 6/1974 | Berman |
| 3,988,710 | 10/1976 | Sidor et al. |
| 4,066,962 | 1/1978 | Jaffe |
| 4,086,533 | 4/1978 | Ricouard et al. |
| 4,107,604 | 8/1978 | Bernier |
| 4,156,191 | 5/1979 | Knight et al. |
| 4,293,837 | 10/1981 | Jaffe et al. |
| 4,392,375 | 7/1983 | Eguchi et al. |
| 4,570,118 | 2/1986 | Tomczak et al. |
| 4,731,579 | 3/1988 | Petersen et al. |
| 4,829,248 | 5/1989 | Loubier |
| 4,857,842 | 8/1989 | Sturman et al. ............ 324/207.2 |
| 4,893,502 | 1/1990 | Kubota et al. |
| 4,922,197 | 5/1990 | Juds et al. ............ 324/207.12 |
| 4,970,463 | 11/1990 | Wolf et al. |
| 5,087,879 | 2/1992 | Sugifune et al. ............ 324/207.12 |

FOREIGN PATENT DOCUMENTS

| | | |
|---|---|---|
| 0053938 | 6/1982 | European Pat. Off. |
| 56-107119 | 8/1981 | Japan |
| 1416925 | 12/1975 | United Kingdom |

Primary Examiner—Walter E. Snow
Attorney, Agent, or Firm—Fitch, Even, Tabin & Flannery

[57] ABSTRACT

An angular position sensor for sensing the angular position of a pivotally mounted device includes a magnetically sensitive device, such as a Hall effect IC, and a plurality of flux concentrators, rigidly disposed relative to the Hall effect IC, forming an assembly. The assembly is disposed in a housing a fixed distance from a rotatably mounted standard magnet defining a fixed air gap therebetween. The magnet is disposed in rotatably mounted magnet holder which also acts as a drive arm that is adapted to be mechanically coupled to a pivotally mounted device. The configuration of the flux concentrators assembled to the magnetically sensitive device cause the output of the Hall effect IC to be generally linear. In order to avoid problems associated with electrically adjustable angular position sensors, the angular position sensor in accordance with the present invention is adjusted mechanically. In particular, a flux concentrator, preferably having a halo shape, is disposed adjacent the magnet. The sensor is calibrated by varying the distance between the halo-shaped flux concentrator and the magnet. In one embodiment of the invention, the halo-shaped flux concentrator is formed to provide temperature compensation for the sensor. The sensor is hermetically sealed and is thus unaffected by wear or vibration.

6 Claims, 5 Drawing Sheets

CONTACTLESS LINEAR ANGULAR POSITION SENSOR HAVING AN ADJUSTABLE FLUX CONCENTRATOR FOR SENSITIVITY ADJUSTMENT AND TEMPERATURE COMPENSATION

BACKGROUND OF THE INVENTION

1. Field of the Invention

The present invention relates to an angular position sensor and more particularly to a linear non-contact angular position sensor for sensing the angular position of a pivotally mounted device, such as a throttle valve, which includes a magnetic sensing element, such as a Hall effect integrated circuit (IC) and a mechanical adjustment mechanism which includes integral temperature compensation that allows the sensitivity of the sensor to be adjusted without the need for potentiometers and the like to provide a generally linear output signal as a function of the angular position of the sensor over a relatively wide temperature range.

2. Description of the Prior Art

Angular position sensors are known to be used for various purposes including throttle position sensors for determining the angular position of a butterfly valve in a throttle body. An example of such a sensor is disclosed in U.S. Pat. No. 4,893,502. Such sensors are generally used to sense the angular position of the butterfly valve in the throttle body in order to control the amount of fuel applied to the combustion chamber of an internal combustion engine.

Various sensors for monitoring the angular position of a pivotally mounted device, such as a butterfly valve, are known. For example, various contact type sensors, such as electromechanical potentiometers are known. Such electromechanical potentiometers include an arcuately-shaped thick film resistive ink resistor and a movably mounted precious metal electrical wiper that is adapted to be mechanically coupled to a butterfly valve such that the relative position of the wiper relative to the resistor varies in accordance with the angular position of the butterfly valve. Such sensors are used to provide an electrical signal which varies as a function of the angular position of the butterfly valve.

There are various known problems with such sensors. For example, such sensors cannot be hermetically sealed due to the dynamic seal required between the butterfly valve shaft and the wiper inside the sensor housing. As is known in the art such dynamic seals are subject to wear over time and thus, can result in degraded sensor performance in time. As such, when such sensors are used in a relatively hostile environment, such as an under-hood environment, dirt, moisture and chemical fumes are known to ingress into the sensor housing and cause degradation and erratic operation of the sensor.

Some known sensors, such as the sensor disclosed in U.S. Pat. No. 4,893,502, avoid the problem of dynamic seals. More particularly, the '502 patent discloses a modified throttle body which incorporates the sensor therewithin. In order to provide access to the sensor, the throttle body is open on one end. The opening is closed by a cover that is secured to the throttle body by way of a plurality of fasteners forming a static seal. However, there are known problems with such static seals. For example, due to the vibration of an internal combustion engine, the fasteners may loosen over time, thus degrading the static seal and, in turn, the sensor.

Another problem with contact type sensors is that they are subject to wear. In particular, the wipers are known to move back and forth in contact across the thick film resistor a relatively large number of times over the expected lifetime of the sensor; perhaps millions of time. Such moving contact causes localized reductions of the thickness of the thick film resistor. Since resistance is a function of cross-sectional area, the reduction of the resistor thickness will change the local resistance value in the portion of the resistor which experiences the greatest amount of wear. As such, this causes drift of the output over time which affects the calibration and linearity of the sensor.

There are other problems with such contact sensors. For example, in some situations, for instance when the engine is run at a nearly constant speed, engine induced vibration can cause additional localized resistor wear, which, as discussed above, can affect the calibration and linear output of the sensor.

In an attempt to overcome the problems associated with such contact type angular position sensors, non-contact sensors have been developed. Moreover, due to the relatively hostile environment of an internal combustion engine, various magnetic sensors have been developed. For example, U.S. Pat. Nos. 3,118,108; 4,392,375 and 4,570,118 disclose magnetic angular position sensors which include two magnets and a magnetically sensitive device, such as a Hall effect device or a magneto-resistor.

However, there are various known problems with such sensors which utilize two magnets. For example, such sensors are relatively more expensive than sensors which utilize a single magnet. Also, calibration of such sensors is relatively difficult. In particular, conventionally available magnets are generally provided in quantity with tolerance ranges of about ten percent. A second magnet doubles the range of potential variability and thus makes calibration relatively more difficult.

Other known angular position sensors avoid the problems of two magnet sensors and utilize a single magnet and a magnetically sensitive device, such as a Hall effect device, for example, as disclosed in U.S. Pat. Nos. 3,818,292; 3,112,464; 4,893,502 and 4,570,118. Such single magnet angular position sensors rely on a varying air gap to vary the magnetic flux density applied to the Hall effect device in response to angular motion. However, the varying air gap of such sensors causes the output signal of the sensor to be exponential and thus relatively non-linear. In order to linearize the response, the magnets utilized with such sensors have been known to be formed from irregular shapes by various known foundry casting methods. However, such cast magnets are known to be rough having imperfections in their surfaces which contribute to part-to-part variation. The process for removing such imperfections is relatively time-consuming and thus adds significantly to the overall cost of the sensor.

Other known single magnet angular position sensors with a varying air gap utilize irregular-shaped magnet holders for skewing the position of the magnet relative to the rotational axis and the Hall effect element. Such irregular-shaped magnet holders add to the overall cost of the sensor and also make the sensor relatively difficult to calibrate.

Angular position sensors which utilize a single magnet and a non-varying air gap are also known, for example, as disclosed in U.S. Pat. No. 4,893,502. The angular position sensor disclosed therein includes a single magnet and a magnetic resistance element (MRE). In this embodiment, a circular magnet is rigidly secured directly to the butterfly valve shaft. The MRE is disposed within a modified throttle body at a fixed air gap relative to the circular magnet. An amplifying circuit with variable gain is used to calibrate the sensors by way of potentiometers or variable resistors. As is known in the art, the output of such potentiometers may vary with temperature or time. Due to the relatively wide operating temperature range of such a sensor in an internal combustion environment, for example, such potentiometers will drift and affect the overall calibration of the device. Another problem with such an arrangement is that the electrical connection between such a potentiometer and the amplifier circuit is known to be made by relatively large macro-scale electrical tracings on a printed circuit board which would be physically large enough to act as an antenna, thus making the circuit relatively susceptible to electromagnetic interference (EMI) and especially radio frequency interference (RFI). As such, the amplifying circuitry would have to be shielded which adds to the cost of the sensor.

SUMMARY OF THE INVENTION

It is an object of the present invention to solve various known problems associated with angular position sensors.

It is yet another object of the present invention to provide a non-contact angular position sensor.

It is yet a further object of the present invention to provide an angular position sensor that utilizes a single magnet.

It is yet a further object of the present invention to provide an angular position sensor that utilizes a fixed air gap.

It is yet another object of the present invention to provide an angular position sensor that provides a generally linear output over a relatively wide temperature range.

It is yet a further object of the present invention to provide an angular position sensor that is mechanically adjustable.

It is yet a further object of the present invention to provide an angular position sensor with self-temperature compensation.

It is yet another object of the present invention to provide a hermetic seal for an angular position sensor that is virtually unaffected by wear or vibration.

Briefly, the present invention relates to an angular position sensor for sensing the angular position of a pivotally mounted device. The angular position sensor in accordance with the present invention is hermetically sealed and thus, is virtually unaffected by wear or vibration, and includes a magnetically sensitive device, such as a Hall effect IC, a plurality of flux concentrators, rigidly disposed relative to the Hall effect IC, forming an assembly. The assembly is disposed in a housing a fixed distance from a rotatably mounted standard magnet defining a fixed air gap therebetween. The magnet is disposed in rotatably mounted magnet holder which also acts as a drive arm that is adapted to be mechanically coupled to a rotatably mounted device. The configuration of the flux concentrators assembled to the magnetically sensitive device cause the output of the Hall effect IC to be generally linear. In order to avoid problems associated with electrically adjustable angular position sensors, the angular position sensor in accordance with the present invention is adjusted mechanically. In particular, an additional flux concentrator, preferably having a halo shape, is disposed adjacent the magnet. The sensitivity of the sensor is adjusted by varying the distance between the additional flux concentrator and the magnet. In one embodiment of the invention, the halo-shaped flux concentrator is formed to provide temperature compensation for the sensor.

BRIEF DESCRIPTION OF THE DRAWING

These and other objects of the present invention will be readily understood with reference to the specification and the following drawings, wherein.

DETAILED DESCRIPTION OF THE PREFERRED EMBODIMENT

The angular position sensor in accordance with the present invention is generally identified with the reference numeral 20. An important aspect of the invention relates to the method for adjustment. In particular, the angular position sensor 20 is adapted to be adjusted mechanically which eliminates the need for potentiometers and the like that are used to calibrate known angular position sensors, such as the angular position sensor disclosed in U.S. Pat. No. 4,893,502. As discussed above, such potentiometers and the like are temperature dependent. Thus, in relatively hostile temperature environments, the calibration of such sensors is affected.

As will be appreciated by those of ordinary skill in the art, the angular position sensor 20 is adapted to be used in various applications for providing a signal representative of the angular position of a pivotally mounted device. The angular position sensor 20 is illustrated and discussed below in an application as a throttle position sensor. However, it should be appreciated by those of ordinary skill in the art that the application of the angular position sensor 20 in accordance with the present invention is also useful for various other applications.

Figure 1:
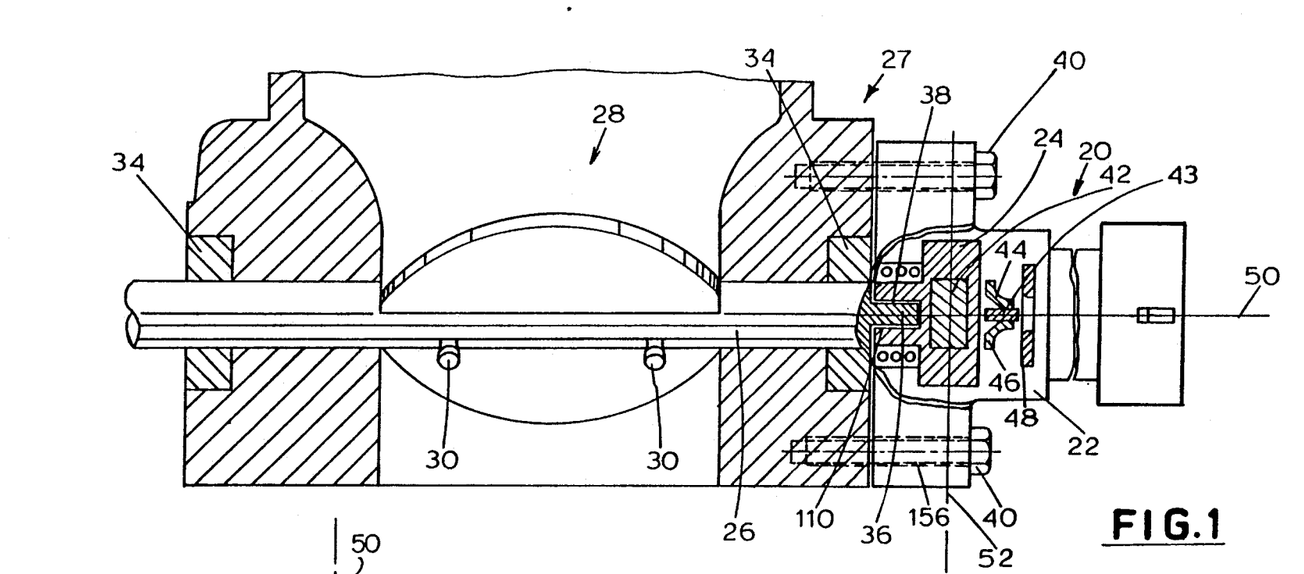
FIG. 1 is a sectional view, partially broken away, of a throttle body with an angular position sensor in accordance with the present invention attached thereto.

With reference to FIG. 1, the angular position sensor 20 is disposed in its own housing 22 and includes a drive arm 24, rotatably mounted relative to the housing 22, that enables the sensor 20 to be mechanically coupled to an output shaft of a pivotally mounted device. In an application, such as a throttle position sensor, the drive arm 24 is mechanically coupled to a butterfly valve shaft 26 carried by a throttle body 27. More particularly, in such an application, a butterfly valve 28 is rigidly affixed to the rotatably mounted shaft 26 with suitable fasteners 30 or by spot welding. The shaft 26 is rotatably mounted relative to a throttle body 27 with suitable bearings 34.

The butterfly valve 28 is formed to close or throttle the air flow to an internal combustion engine (not shown). By coupling the angular position sensor 20 to the butterfly valve shaft 26, the angular position sensor 20 is adapted to provide a signal representative of the angular position of the butterfly valve 28 for use in controlling the amount of fuel applied to the combustion chamber in an internal combustion engine.

It is contemplated that the shaft 26 and the drive arm 24 be prevented from rotating relative to each other. Various means can be used for preventing such rotation; all of which are intended to be included within the broad scope of the invention. As shown, the butterfly valve shaft 26 is formed with a reduced cross-sectional area portion or tongue 36 which extends outwardly from one side of a throttle body 27 to allow engagement with the drive arm 24. In order to prevent the rotation of the tongue 36 relative to the drive arm 24, the tongue 36 may be formed with a non-circular cross-section that is adapted to mate with a cooperating recess 38 formed in the drive arm 24.

Another important aspect of the angular position sensor 20 is that it is formed as a separate unit that is adapted to rather quickly and easily be secured to, for example, the throttle body 27 by way of suitable fasteners 40. By providing the angular position sensor 20 as a separate unit, the calibration of the sensor 20 can be done at the factory by the sensor manufacturer. In contrast, some known angular position sensors are incorporated directly into the throttle body, for example, as disclosed in U.S. Pat. No. 4,893,502. In such an embodiment, calibration of the sensor is normally done by the throttle body manufacturer whose experience with such sensors is admittedly less than the sensor manufacturer.

Figure 2:
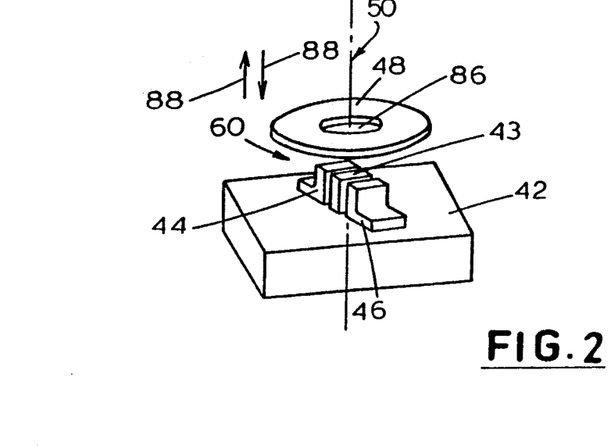
FIG. 2 is a simplified perspective view of the angular position sensor in accordance with the present invention.
Figure 3:
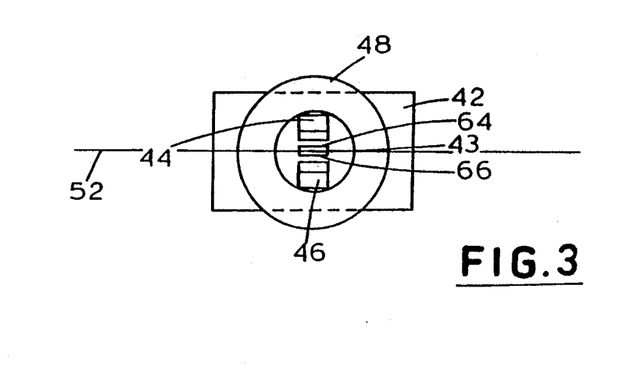
FIG. 3 is a plan view of the angular position sensor illustrated in FIG. 2.

FIGS. 2 and 3 illustrate the basic principals of the angular position sensor 20 in accordance with the present invention. In particular, the angular position sensor 20 includes a magnet 42, preferably a standard bar-shaped magnet defining opposing North and South magnetic poles, a magnetic sensing element 43, a pair of generally L-shaped flux concentrators 44 and 46 and an additional flux concentrator 48, used for adjustment. As will be discussed in more detail below, the magnet 42 is adapted to be mounted in the drive arm 24 for rotation about an axis 50 (FIG. 1) that is generally perpendicular to a magnetic axis 52 which interconnects the opposing North and South magnetic poles, as shown in FIG. 1. As will be discussed in more detail below, the magnet 42 is mounted within the drive arm 24 such that the axis of rotation 50 of the magnet is coaxial with the butterfly valve shaft 26 and generally perpendicular to the magnetic axis 52 such that rotation of the butterfly valve shaft 26 causes rotation of the magnet 42 about the axis 50 by a corresponding amount.

The magnetic sensing element 43 is preferably a Hall effect IC with on-chip amplifier circuits, for example, an Allegro Model No. 3506. Since the angular position sensor 20 is adjusted mechanically there is no need for external circuitry for electrically adjusting the sensor 20. As such, the output of the magnetic sensing device 43 is adapted to be directly coupled to the fuel control circuit (not shown) for the internal combustion engine. By eliminating the need for external potentiometers or variable resistors, the need for conductive tracings on a printed circuit board to connect the magnetic sensing device 43 to such external potentiometers or variable resistors is eliminated. As mentioned above, the conductive tracings in such an application can act as antennas and thus subject the sensor to various electromagnetic interference. In sensors which incorporate such external potentiometers or variable resistors for adjustment, for example, as disclosed in U.S. Pat. No. 4,893,502, the circuitry must be shielded against electromagnetic interferences which adds to the cost of the sensor. Such external potentiometers or variable resistors are also affected by temperature. Thus, in a relatively hostile environment, such as an under-hood environment of an internal combustion engine, the calibration drifts with temperature change. The angular position sensor 20 in accordance with the present invention solves these problems by using a mechanical adjustment for the sensor which eliminates the need for external potentiometers and the like.

Figure 13:
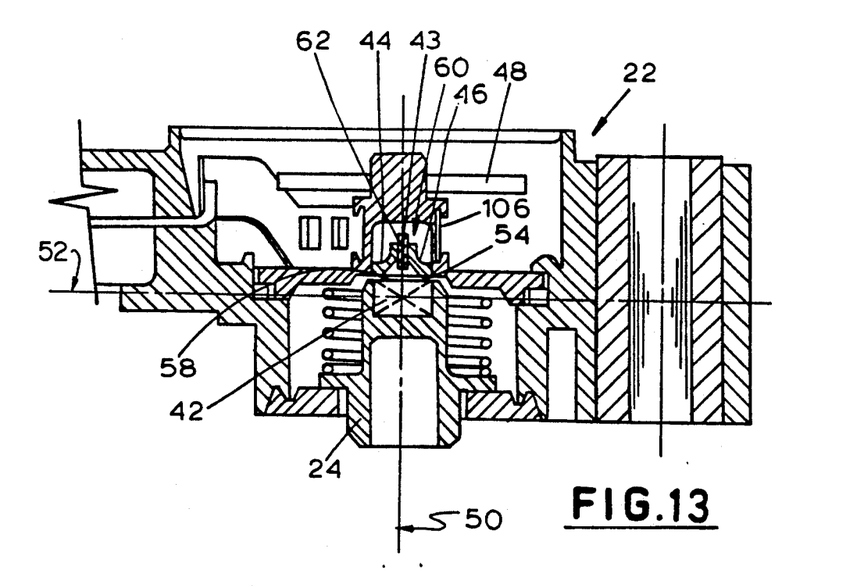
FIG. 13 is a cross-sectional view of an angular position sensor incorporating the carrier assembly illustrated in FIGS. 11 and 12.

As best shown in FIG. 13, the magnetic sensing element 43 is mounted stationary relative to the housing 22 at a fixed air gap 54 relative to a surface 58 of the magnet 42 that is generally parallel to the magnetic axis 52. The generally L-shaped flux concentrators 44 and 46 are rigidly disposed relative to the magnetic sensing device 43 forming an assembly 60. In particular, the magnetic sensing device 43 is sandwiched between the generally L-shaped flux concentrators 44 and 46 to form the assembly 60. The assembly 60 is disposed such that a sensing plane 62, defined by the magnetic sensing element 43, is generally parallel to the axis of rotation 50 of the magnet 42. As shown, a Hall effect IC is used as the magnetic sensing element 43. In such an embodiment, the sensing plane 62 is defined as a plane generally parallel to opposing surfaces 64 and 66, shown in FIG. 4.

As shown in FIG. 2, the assembly 60 is disposed such that the axis of rotation 50 of the magnet 42 is through the midpoint of the magnetic sensing device 43 and parallel to the sensing plane 62. However, it is also contemplated that the assembly 60 can be disposed such that the axis of rotation 50 is offset from the midpoint of the magnetic sensing element 43 along an axis generally parallel to the sensing plane 62.

Figure 4:
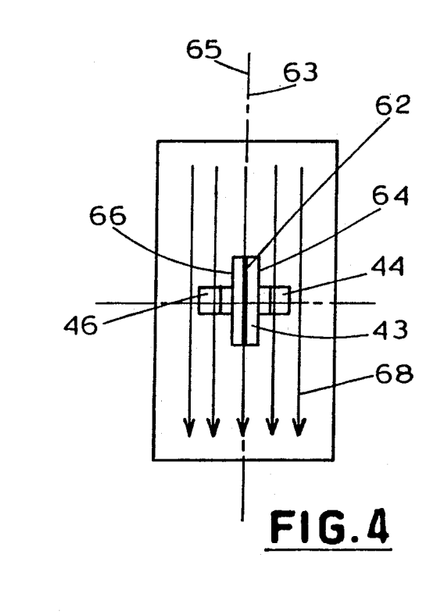
FIG. 4 is a simplified plan view of the angular position sensor in accordance with the present invention illustrating the relationship between the angular position sensor and the magnetic flux in a static position.
Figure 5:
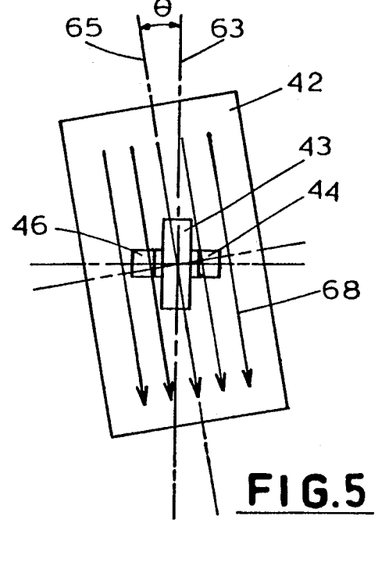
FIGS. 5 and 6 are similar to FIG. 4 and illustrate the relationship between the angular position sensor and the magnetic flux in various operating positions.
Figure 6:
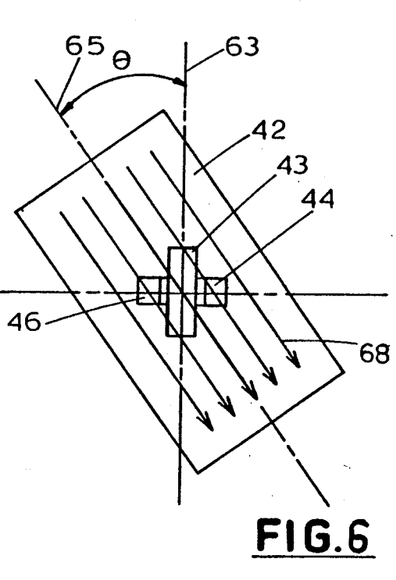

As shown in FIG. 4, the angular position sensor 20 is in a quiescent state. In this state the magnetic flux density B, represented by the arrows identified with the reference numeral 68, is generally parallel to the sensing plane 62 of the magnetic sensing device 43. In this state the magnetic sensing element 43 outputs a quiescent voltage. For an Allegro Model No. 3506 Hall effect IC, the quiescent output voltage is typically about 2.5 volts DC. Rotating the magnet 42 counterclockwise as shown in FIGS. 5 or 6 or clockwise (not shown) causes an ever increasing amount of magnetic flux density 68 to be applied to the sensing plane 62 of the magnetic sensing element 43 to vary the output voltage of the magnetic sensing element 43 as a function of an angle $\theta$ defined between an axis 63 parallel to the sensing plane 62 and an axis 65. For an Allegro Model No. 3506, the output voltage swing is approximately ±2.0 volt DC depending on the direction of the angular rotation.

In accordance with an important aspect of the invention, the relationship between the axes 63 and 65 can be varied in order to adjust the offset voltage of the sensor 20. In particular, the assembly 60 is rotated relative to the magnet 42 in a quiescent state to adjust the sensor offset voltage. In such an application, the sensor would be configured in the quiescent state to have a small angle $\theta$ between the axes 63 and 65 as illustrated in FIG. 4.

Figure 7:
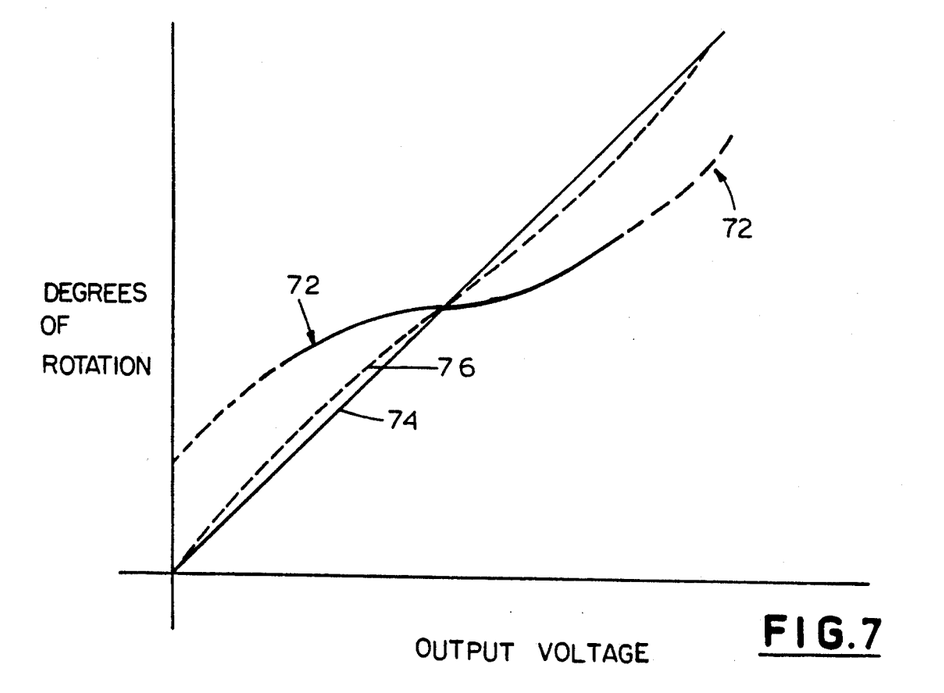
FIG. 7 is an exemplary graph illustrating the relationship between the output voltage of the angular position sensor versus degrees of rotation shown in dotted line with a superimposed curve which illustrates the effects of the flux concentrators in accordance with the present invention.

As will be discussed in more detail below, an important aspect of the invention relates to the fact that the output voltage of the angular position sensor 20 varies linearly as a function of the angular rotation of the magnet 42. As such, the output voltage of the angular position sensor 20 can be applied directly to the fuel consumption circuit for the internal combustion engine without the need for additional and expensive external circuitry. In particular, known angular position sensors have utilized various circuitry including microprocessors to linearize the output voltage, which adds to the complexity and cost of the sensor. The angular position sensor 20 in accordance with the present invention eliminates the need for such external circuitry. In particular, the output signal is linearized by way of the generally L-shaped or book-end type flux concentrators 44 and 46, which not only direct the magnetic flux and control the density and polarity of the magnetic flux density but also linearize the output signal to near straight line form. As such, the angular position sensor 20, in accordance with the present invention, is adapted to be substituted for potentiometer-type throttle position sensors which are contact devices with a finite life. More particularly, FIG. 7 illustrates a graph of the output voltage of the angular position sensor 20 as a function of the degrees of rotation. The solid line 72 represents the output of the angular position sensor 20 without the book-end shaped flux concentrators 44 and 46. As shown, the output voltage of such an embodiment varies relatively non-linearly relative to the degrees of rotation. By incorporating the book-end shaped flux concentrators 44 and 46, the output voltage of the angular position sensor 20 becomes fairly linear. More particularly, the solid line 74 represents the desired relationship between the output voltage of the angular position sensor 20 versus the degrees of rotation of the magnet 42. The dashed line 76 represents the output voltage of the sensor 20 which incorporates the book-end shaped flux concentrators 44 and 46. As illustrated, the dashed line 76 is fairly linear over the anticipated operating range of the sensor, for example, 110° rotation.

Figure 8:
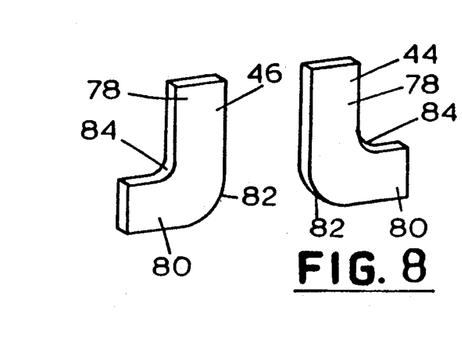
FIG. 8 is a perspective view of a pair of flux concentrators which form a portion of the present invention.
Figure 9:
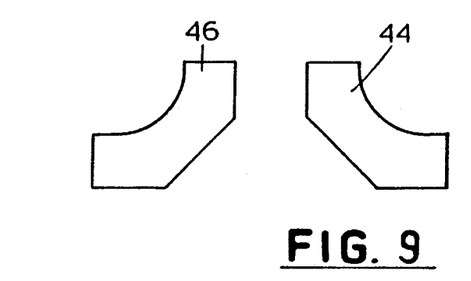
FIG. 9 is an elevational view of an alternate embodiment of the flux concentrators illustrated in FIG. 8.

The book-end shaped flux concentrators 44 and 46 are formed from a magnetically soft material — a magnetically permeable material which does not retain residual magnetism. Various configurations of the book-end shaped flux concentrators 44 and 46 are contemplated, for example, as shown in FIGS. 8 and 9. Referring to FIG. 8, the book-end flux concentrators 44 and 46 are formed in a generally L-shape defining two depending leg portions 78 and 80. The outer intersection of the depending legs 78 and 80 defines a heel portion 82. The inner intersection of the depending legs 78 and 80 defines a generally arcuately-shaped inner portion 84. It is also contemplated that the inner portion 84 may be formed such that the depending leg portions 78 and 80 are virtually perpendicular at the point of intersection or have a predetermined radius of curvature as illustrated in FIG. 8. In the preferred embodiment illustrated in FIG. 9, the flux concentrators 44 and 46 are formed in a similar manner as the flux concentrators illustrated in FIG. 8 but with the heel portion 82 removed and a relatively larger radius of curvature for the inner portion 84.

In accordance with another important aspect of the invention, the sensor 20 allows the sensitivity (e.g., volts/degree of rotation) of the sensor 20 to be adjusted mechanically. As discussed above, various known sensors utilize potentiometers or variable resistors and the like for varying the sensitivity of the sensor. However, such sensors are relatively temperature dependent. Thus, in a relatively hostile environment where the temperature is anticipated to vary over a relatively wide range, the calibration of such sensors is known to drift. The angular position sensor 20 in accordance with the present invention solves this problem by providing a method for mechanically adjusting the sensitivity of the sensor without the need for potentiometers and the like. In particular, an additional flux concentrator 48 is provided. Although the flux concentrator 48 is described and illustrated having a halo or washer shape, as illustrated in FIG. 2, for example, it is to be understood that various shapes for the flux concentrator 48 are contemplated. For example, a rectangular shape may be used for the flux concentrator as illustrated and identified with reference numeral 48' in FIG. 15. In such an embodiment, various means within the ordinary skill in the art are contemplated for supporting the flux concentrator 48 relative to the magnet 42.

In the preferred embodiment, the flux concentrator 48 is formed in a generally circular or halo shape with a centrally disposed aperture 86. The flux concentrator 48 is adapted to be disposed such that the midpoint of the aperture 86 is generally coaxial with the axis of rotation 50 of the magnet 42. The sensor's sensitivity is adjusted by varying the distance between the flux concentrator 48 and the magnet 42 in an axial direction relative to the axis of rotation 50 as indicated by the arrows 88 (FIG. 2). It is contemplated that the plane of the flux concentrator 48 be generally parallel to the plane of the magnet 42. The halo-shaped flux concentrator 48 thus provides a mechanical and relatively stable method for adjusting the sensitivity of the sensor 20 utilizing a relatively inexpensive and until now often impractical class of linear IC; impractical because of the relatively wide range of part-to-part electrical output values of offset voltage and sensitivity per gauss.

Figure 10:
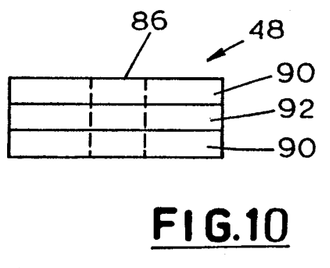
FIG. 10 is an elevational view of a halo-shaped flux concentrator which forms a portion of the present invention.

In an alternate embodiment of the invention as illustrated in FIG. 10, it is contemplated that the flux concentrator 48 be formed to be self-temperature compensating. In this embodiment, the flux concentrator 48 may be formed in a plurality of layers. Three layers are shown for example. The outer layers 90 are formed from a first material, for example, an iron-nickel alloy comprised of approximately 29%-33% nickel. The inner layer 92 is formed from low carbon steel, for example, C1008 low carbon steel. With such an embodiment, the properties of the nickel alloy used in the outer layers 90 cause the permeability of the outer layers 90 to decrease with an increase in temperature which decreases the ability of the flux concentrator 48 to concentrate magnetic flux as a function of temperature. Thus, as the temperature increases, the magnetic flux concentrator 48 captures less of the magnetic field causing a relatively greater portion of the magnetic field to be applied to the magnetic sensing element 43 during such a condition. Thus, since it is known that the magnetic field intensity of known magnets weakens as a function of temperature, the magnetic flux concentrator 48 illustrated in FIG. 10 allows a greater percentage of the magnetic flux density 68 to be applied to the magnetic sensing element 43 during relatively high temperature conditions and is thus self-temperature compensating.

Figure 11:
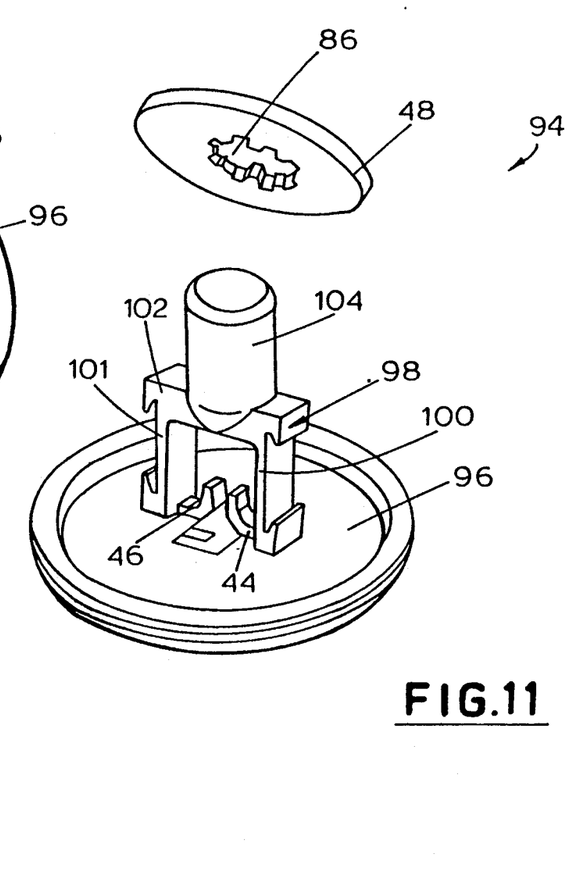
FIG. 11 is a perspective view of one embodiment of a carrier assembly in accordance with the present invention, shown with a flux concentrator removed.
Figure 12:
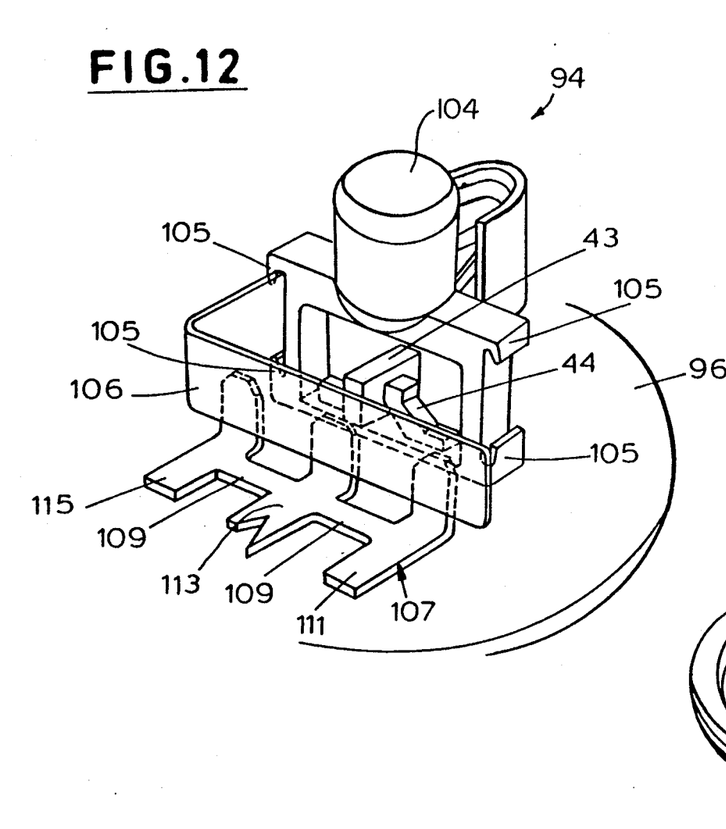
FIG. 12 is a perspective view of the assembly illustrated in FIG. 11 in a further stage of development.

FIGS. 11 and 12 illustrate a carrier assembly 94 for carrying the magnetic sensing device 43 as well as the magnetic flux concentrators 44, 46 and a halo-shaped flux concentrator 48. In particular, FIG. 11 illustrates the carrier assembly 94 with the halo-shaped flux concentrator 48 removed. The carrier assembly 94 includes a disk-shaped base portion 96 and a generally T-shaped frame portion 98. The T-shaped frame portion 98 defines a pair of depending legs 100 and 101, disposed generally perpendicular to the plane of the base portion 96, interconnected by a connecting member 102. A stud portion 104 is formed to extend outwardly from the connecting member 102. The stud portion 104, as will be discussed in more detail below, is used for adjusting the distance between the halo-shaped flux concentrator 48 and the magnet 42. In alternate embodiments of the invention where a configuration other than a halo shape is used for the additional flux concentrator, for example, a rectangular shape, as illustrated in FIG. 15, the stud portion 104 is unnecessary and thus eliminated and substituted with a suitable arrangement for supporting such a flux concentrator 48' relative to the magnet 42.

Referring back to the preferred embodiment, the halo-shaped flux concentrator 48 is shown with a generally star-shaped aperture 86. In such an application, the diameter of the stud 104 is formed to provide a friction fit with the irregular-shaped aperture 86 to allow the sensitivity of the sensor 20 to be adjusted by way of axial movement of the flux concentrator 48 relative to the magnet 42. In an alternate embodiment of the invention, it is contemplated that the stud 104 and the aperture 86 be threaded to enable the distance between the flux concentrator 48 and the magnet 42 to be varied by rotating the flux concentrator 48.

The book-end type flux concentrators 44 and 46 are disposed intermediate the depending legs of the T-shaped frame 98 to enable the magnetic sensing device 43 to be sandwiched therebetween. As shown best in FIG. 14, the magnetic sensing device 43 is a three wire Hall effect IC. This magnetic sensing device 43 is adapted to be connected to a flexible printed circuit board 106 (FIG. 12) and wrapped around the frame 98 as best illustrated in FIG. 12. Opposing fingers 105 may also be formed in the depending leg portions 100 and 101 to capture a portion of the printed circuit board 106 as shown. A terminal structure 107 is then connected to the printed circuit board 106 to enable the sensor 20 to be connected to an external electrical conductor (not shown). The terminal structure 107 is shown in FIG. 12 with bridging members 109, which are removed to form three electrical terminals 111, 113 and 115. The carrier assembly 94 complete with the printed circuit board 106 is then assembled to the housing 22 as illustrated in FIG. 13.

Figures 14, 15:
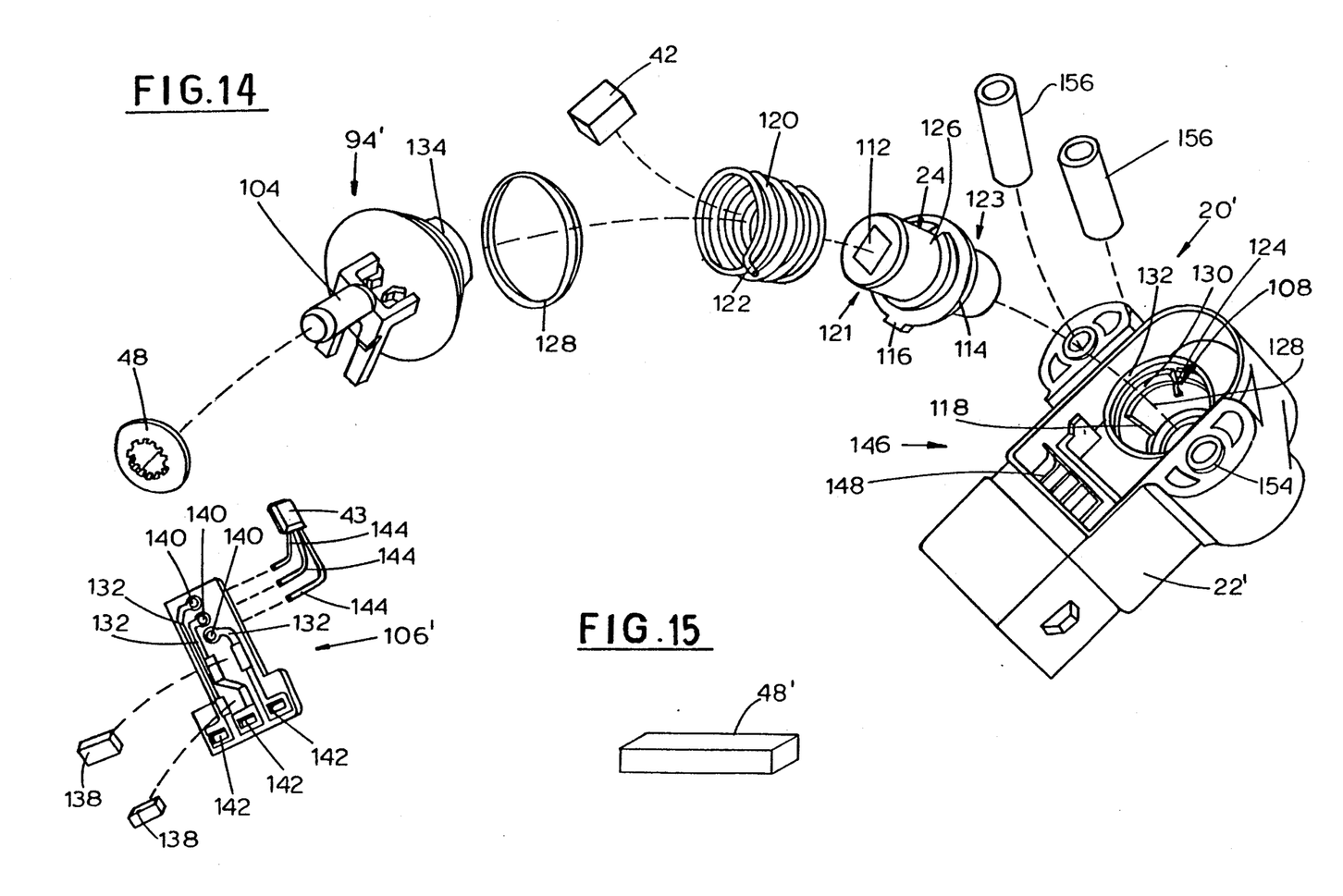
FIG. 14 is an exploded perspective view of an alternate embodiment of the angular position sensor in accordance with the present invention.
FIG. 15 is a perspective view of a flux concentrator in accordance with the present invention.

An alternate embodiment of the sensor is illustrated in FIG. 14, identified with the reference numeral 20'. In this embodiment, like components are identified with the same reference numerals and are distinguished with primes. The housing 22' is formed as an irregular-shaped housing with a central aperture 108 for receiving the drive arm 24. As best shown in FIG. 1, the drive arm 24 is formed with a centrally disposed aperture 110 on one end (FIG. 1) that is keyed or otherwise adapted to rotate with the butterfly valve shaft 26 defining a drive arm portion 123 (FIG. 14). The other end of the drive arm 24 is provided with a generally rectangular aperture 112 defining a magnet holder portion 121 for receiving the magnet 42. The drive arm 24 is adapted to be received in the aperture 108 formed in the housing 22'. The drive arm 24 may be formed with an integral washer 114 with an extending tongue 116. The tongue 116 cooperates with stops 118 formed within the aperture 108 which are radially disposed to limit the rotation of the drive arm 24 relative to the housing 22'. As will be appreciated by those of ordinary skill in the art, the location of the stops 118 within the aperture 108 are provided to coincide with the expected angular rotation of the device whose angular position is being sensed. As mentioned above, when the angular position sensor 20 in accordance with the present invention is used as a throttle position sensor, the stops 118 are provided to allow for about 110° of rotation. In alternate embodiments of the invention, the housing 22 may be formed without the stops 118 to enable a full 360° of isolation for the sensor 20.

The drive arm 24 may be biased by a torsion spring 120 having extending end portions 122. The bottom end portion (not shown) is adapted to be received in a slot 124 formed in the aperture 108. The top end portion 122 is received in a corresponding slot 126 formed in the drive arm 24. The diameter of the torsion spring 120 is sized to be slightly larger than the magnet holder portion 121. In embodiments wherein the sensor is adapted to rotate 360°, the torsion spring 120 is eliminated.

The aperture 108 is formed with concentric walls 128, 130 and 132. The concentric wall 128 only spans a portion of the circumference of the aperture 108 to form the stops 118 as discussed above. The drive arm portion 123 is received within the aperture 108 to allow rotational movement of the tongue 116 relative to the stops 118, formed in the partial concentric inner wall 128. The magnet holder portion 121 is received in an integrally formed circular guide, 134 formed on the underside of the carrier 94'. Once the drive arm 24 and torsion spring 120 are disposed within the aperture 108, the carrier assembly 94 closes the aperture 108 by way of an O-ring 158 forming the angular position sensor in accordance with the present invention. As shown, the carrier 94' and printed circuit board 106' are configured differently than the embodiment illustrated in FIGS. 11-13.

As shown, the printed circuit board 106' may include three conductive tracings 132 for connecting the electrical conductors 144 from the magnetic sensing element 43 thereto. A pair of capacitors 138, preferably surface mount capacitors, are electrically connected with the conductive tracings 132 to suppress noise-to-ground. Three plated-through holes 140 are provided for connecting the conductors 144 of the magnetic sensing device 43 to the printed circuit board 106'. The printed circuit board 106' includes an additional three plated-through holes 142 for connection with corresponding terminals 148, insert molded into the housing 22', which enables the sensor 20' to be connected to an external electrical conductor (not shown). Once the components of the sensor 20' are assembled, the component side 146 of the sensor 20' is then potted with a suitable potting compound, such as epoxy to seal the electrical components. This allows the electrical components of the sensor to be sealed from moisture, contaminants and the like without the need for a dynamic or a static seal as discussed above. As such, the seal in accordance with the present invention is virtually unaffected by wear or vibration.

As discussed above, the angular position sensor 20, 20' is connected to a throttle body 27 by way of the fasteners 40. Thus, the housing 22, 22' may be provided with a pair of oppositely disposed apertures 154 for receiving a pair of insert molded mounting sleeves 156. The fasteners 40 are received in the mounting sleeves 156 and are used to connect the sensor 20, 20' to the throttle body 27.

While the invention has been described with reference to details of the embodiments shown in the drawings, these details are not intended to limit the scope of the invention as described in the appended claims.

What is claimed is:

1. An angular position sensor for sensing the angular position of a pivotally mounted device comprising:
   a housing;
   a magnet for generating magnetic flux defining a magnetic axis through opposing North and South magnetic poles;
   a drive arm, rotatably carried relative to said housing, said drive arm including means for providing a mechanical coupling to said pivotally mounted device and means for carrying said magnet;
   means disposed adjacent said magnet for sensing the magnetic flux density generated by said magnet;
   means for mechanically adjusting said sensing means;
   means for carrying said sensing means at a predetermined fixed air gap relative to said magnet;
   means for providing temperature compensation for said sensors, wherein said temperature compensation providing means includes a flux concentrator.

2. An angular position sensor as recited in claim 1, wherein said flux concentrator is formed from a plurality of materials defining one or more layers.

3. An angular position sensor as recited in claim 2, wherein said one or more of said layers are formed from a material whose permeability decreases at a different rate with increasing temperature relative to the other material layer.

4. An angular position senor as recited in claim 3, wherein said one or more of said layers are formed from an iron-nickel alloy.

5. An angular position sensor as recited in claim 2, wherein said one or more of said layers are formed from steel.

6. A method for adjusting the sensitivity of a throttle position sensor which includes a magnet and a magnetic sensing element, said throttle position sensor including a magnet, a magnetic sensing element, disposed a first predetermined distance from said magnet and a movably mounted flux concentrator, disposed a second predetermined distance from said magnet, said magnet and said magnetic sensing element being rotatably mounted relative to each other; the method comprising the steps of:
   a) varying said second predetermined distance until the desired sensitivity is attained without altering said first predetermined distance; and
   b) securing said flux concentrator in place at the location of desired sensitivity.

* * * * *